L. C. MURET.
AGRICULTURAL TRACTOR.
APPLICATION FILED JULY 7, 1919.

1,412,366.

Patented Apr. 11, 1922.
4 SHEETS—SHEET 2.

Witnesses:

Inventor:
Léon Charles Muret.
per
Attorney.

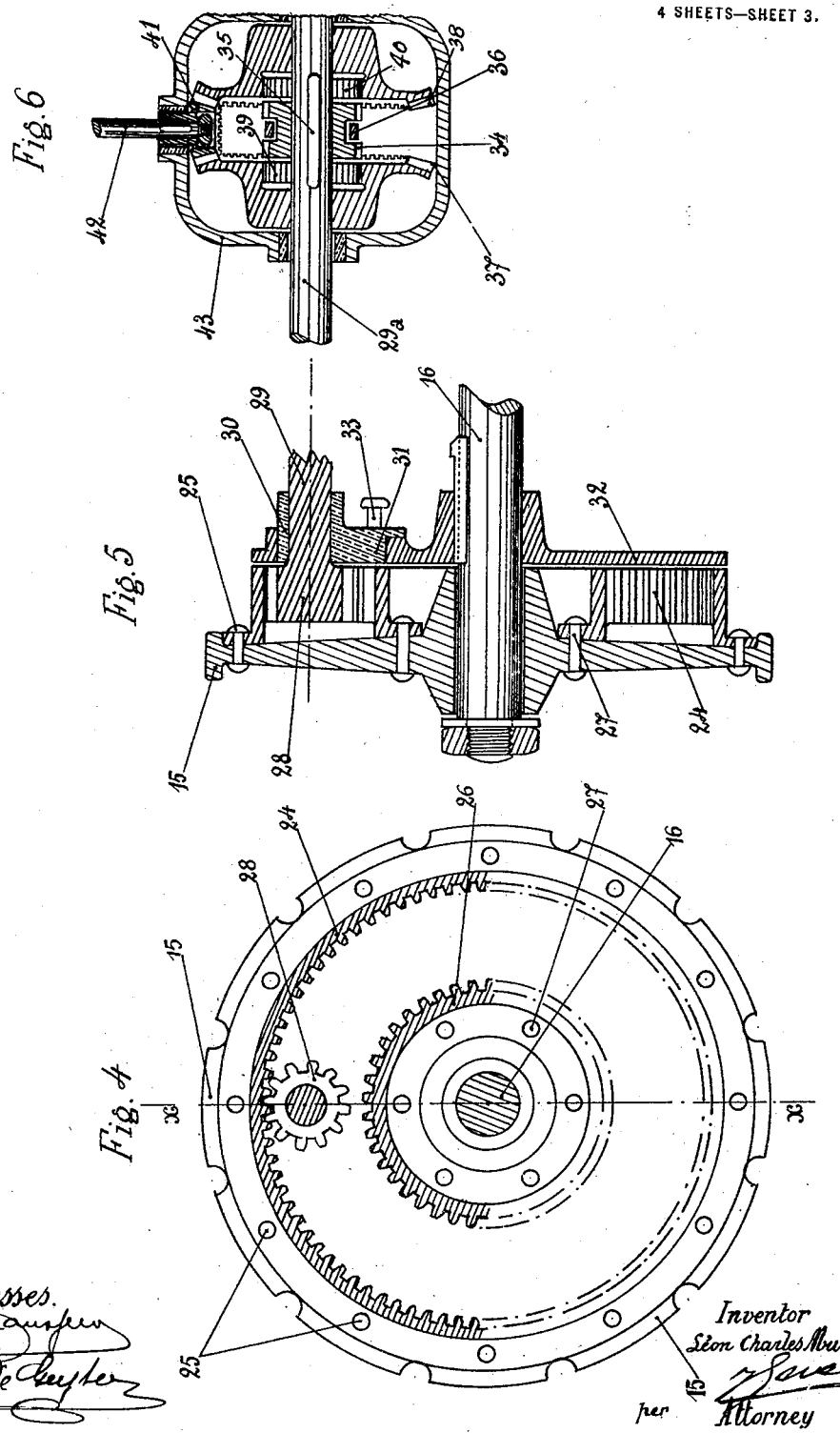

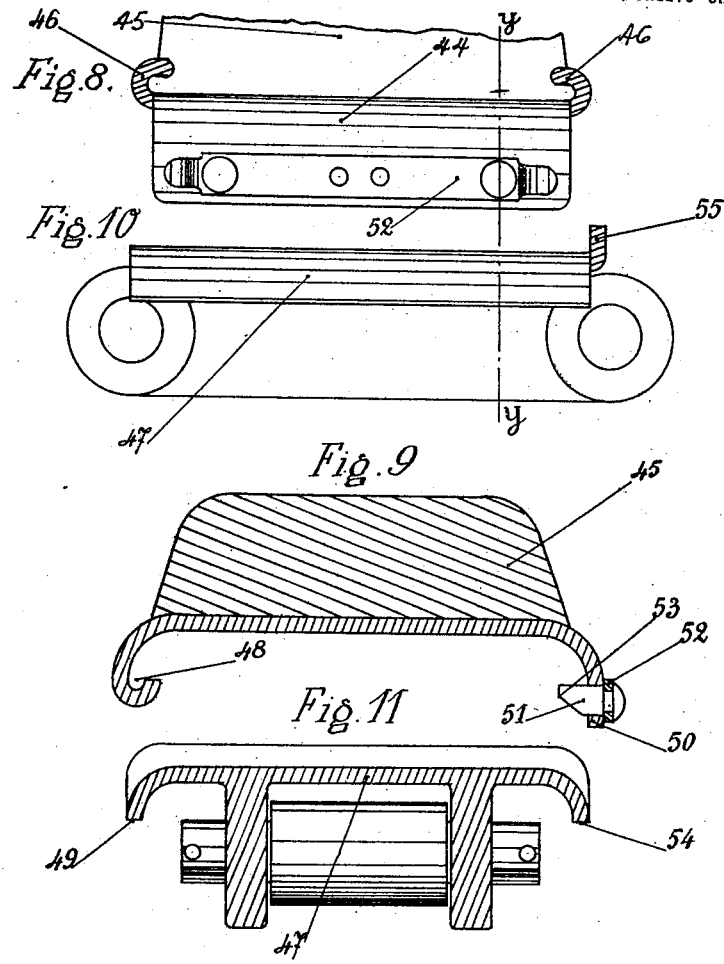
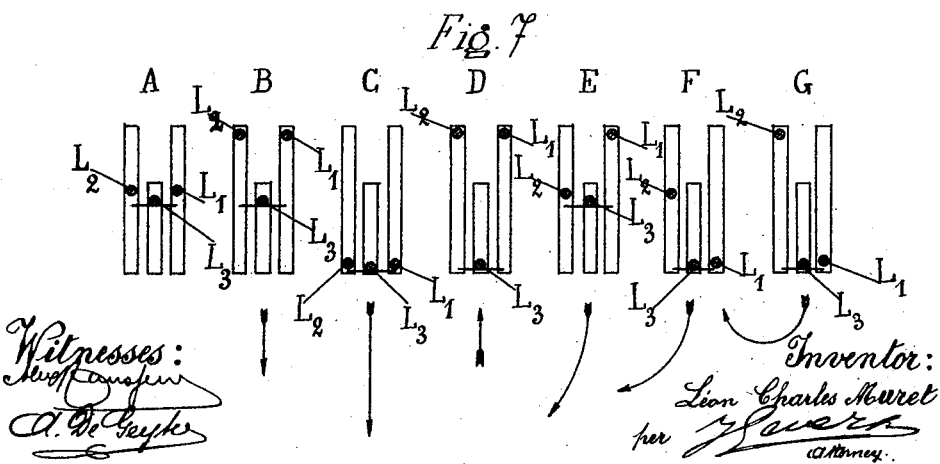

UNITED STATES PATENT OFFICE.

LEON CHARLES MURET, OF NICE, FRANCE.

AGRICULTURAL TRACTOR.

1,412,366.  Specification of Letters Patent.  Patented Apr. 11, 1922.

Application filed July 7, 1919. Serial No. 309,103.

*To all whom it may concern:*

Be it known that I, LEON CHARLES MURET, a citizen of the French Republic, residing at Nice, Alpes Maritimes, in State of France, have invented certain new and useful Improvements in Agricultural Tractors; and I do hereby declare the following to be a full, clear, and exact description of the invention, such as will enable others skilled in the art to which is appertains to make and use the same.

The present invention relates to an agricultural tractor and the principal objects of the invention are to obtain first, a convenient resilient suspension, second, a maximum of flexibility in the elements for the operation of the tractor, three, a simple and rapid transformation of the tractor for the purpose of travelling on roads.

Figure 1:
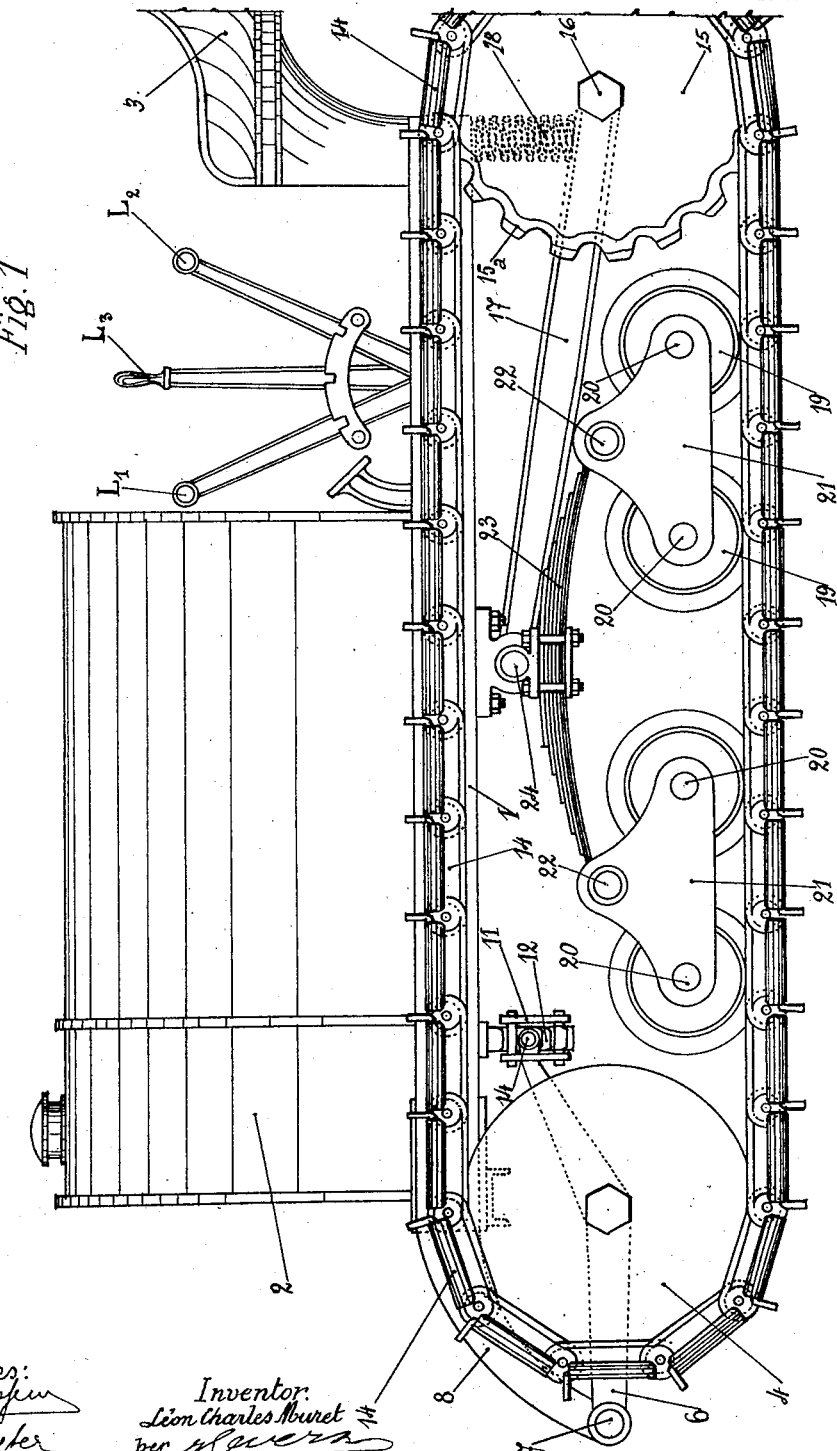
Figure 2:
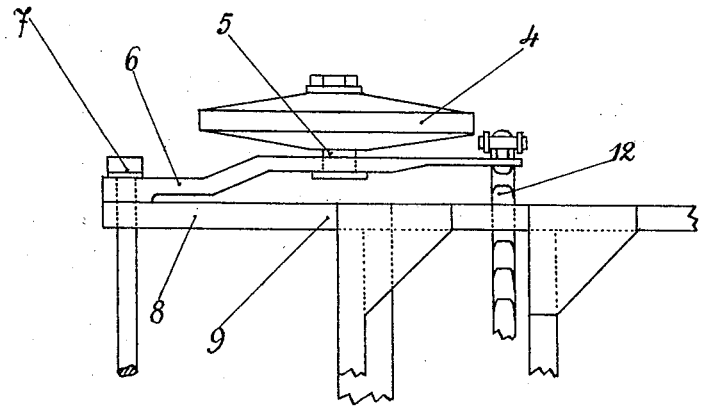
Figure 3:
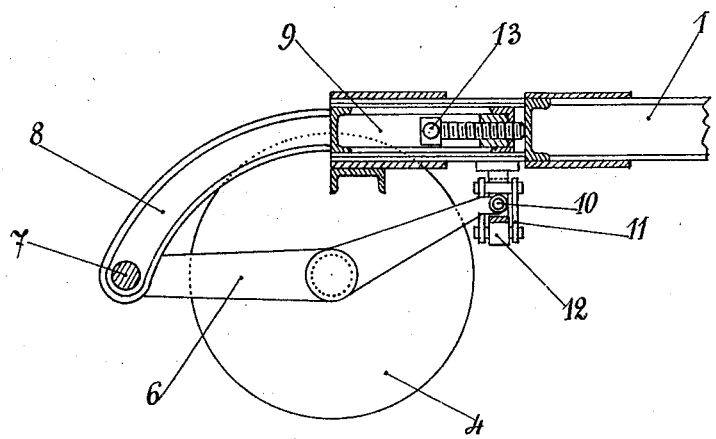

In the accompanying drawings, a preferred form of the tractor forming the subject of this invention is illustrated, Figure 1 showing a side view of the complete tractor, Figures 2 and 3 respectively views in plan and elevation of the adjusting system for the tractor chains and a part of the suspension device, Figures 4, 5, 6 and 7 showing details of arrangement of the means for changing speed and reversing, Figure 4 being a view in elevation partly in section, Figure 5 being a vertical sectional view on the line $x$—$x$ of Figure 4, Figure 6 being a sectional view through the axis of a motor shaft and Figure 7 being a diagram of the various combinations employed for manœuvering the tractor. Figures 8, 9, 10 and 11 show on enlarged scale the details of the elements by means of which the tractor chains are modified for travelling on the roads; Figures 8 and 10 being views in elevation and Figures 9 and 11 showing sectional views of the same on the vertical plan $y$—$y$ in Figures 8 and 10.

Upon the rigid frame 1 are fastened the motor 2 and the driver's seat 3. The hand levers and pedals for operating the tractor are placed within reach of the hand of the driver as he is seated on this seat. The wheel carriage comprises a front bogie, a rear carriage and two intermediate axles.

The front bogie (Figure 1) comprises two flat rimmed wheels, each of which is loosely mounted on an axle 5 upon which is fitted a lever 6 pivotally mounted upon one end of the trunnion 7, fixed upon the front bracket 8 of the stretching frame 9. The lever 6 is secured at its opposite end to one end of the transverse leaf spring 12 which is fixed in the middle to the stretching frame 9. This frame 9 is mounted on the front end of the main frame 1 in such a manner that it may be made to slide with respect to this frame and may be adjusted in position by means of screws 13, whereby the tractor chains may be stretched.

The rear carriage comprises two driving wheels 15 with rims 15$^A$ provided with teeth adapted for operative engagement with the tractor chains. These wheels are loosely mounted upon the rear axle 16, which is attached to the frame 1 by struts 17 and springs 18 shown in dotted lines in Figure 1. The tractor chains 14 are carried around the front and rear wheels at each side of the frame.

Added to the front and rear carriages are disposed two intermediate carriages which are similar but independent of each other, at each side of the frame. Each of these intermediate carriages is preferably formed with two wheels 19 rolling upon rails formed upon the inside faces of the individual plates of the tractor chains. These wheels are loosely mounted upon axles 20 fitted between the mounting plates 21 which in turn are pivotally mounted upon axles 22 carried at the ends of the leaf spring 23, which spring is fixed at its middle portion to the frame 1 by means of a trunnion 24 which permits the spring to rock freely.

In operation the weight of the frame 1 and of the parts fastened to it is distributed on the five springs, 12, 18 and 23, and thus the four carriages and the tractor chains under them are enabled to accommodate themselves to irregularities of the ground.

The steering of the tractor is accomplished by changing the relative movement of the two tractor chains which are independently driven and the entire operation is controlled by means of the speed changing and reversing gears which are shown in Figures 4, 5, 6 and 7 and comprise three different parts.

The first parts (Figures 4 and 5) are similar and are preferably disposed within the rear driving wheels 15. Each of these parts comprises an internally toothed gear 24 attached concentrically to the rim of the wheel 15 by rivets or bolts 25; an external toothed gear 26 attached concentrically to the hub of the wheel 15 by rivets or bolts 27 and a spur pinion 28 adapted to engage with the preceding gears.

The pinion 28 is keyed on a shaft 29 turning in a bearing 30 which bearing is mounted in an eccentric 31 adapted to be moved through a half turn within a circular opening in the plate or shield 32, which latter is keyed upon the rear axle 16. The eccentrics 31 are controlled by any suitable means as, for example, by rods operating the trunnions 33 and by hand levers $L^1$, $L^2$ (Figure 1).

By revolving the eccentric 31 the shaft 29 is moved allowing the pinion 28 to engage either with the internally toothed gear 24 or with the gear 26, thus obtaining two different gear relations. In each position the direction of rotation of the pinion 28 determines the direction of rotation of each corresponding driving wheel, and the direction of rotation of the pinion 28 is determined by the elements shown in Figure 6. Here a cross shaft $29^a$ is arranged in prolongation of the shafts 29 and attached to said shafts by means of Cardan joints, in such a way as to work in various positions. The twin spur pinion 34 is mounted on this shaft $29^a$ being keyed thereon and adapted to slide thereon, and may be shifted upon the shaft by a member 36 operating in a groove of the pinion and controlled by the middle hand lever $L^3$ (Figure 1).

Two bevelled gears 37 and 38 are loosely mounted on the shaft $29^a$ and are provided at 39 and 40 with internal teeth adapted to engage respectively with one or the other of the parts of the twin pinion 34, according to the direction of the motion of the clutch 36, these gears 37 and 38 are in constant engagement with the bevelled pinion 41 which is keyed on an extension 42 of the main motor shaft, so that they are made to revolve in opposite directions. It will be seen that the shaft $29^a$, and therefore the shafts 29, will be made to revolve in one direction or another according as the pinion 34 engages with the gear 37 or the gear 38.

The whole system is enclosed within a casing 43 attached to the rear axle casing and between the rear driving wheels in such a way that the shaft $29^a$ lies in the prolongation of shafts 29 as above stated.

Two band brakes are applied to the outer rims of the drums of the internally toothed gears 24. These brakes may be controlled either independently by two pedals or simultaneously by a hand lever.

The shaft 42 is connected to the motor by an intermediate coupling device controlled by a pedal.

The speed changing and reversing gear work as follows (see Figure 7).

The hand levers $L^1$, $L^2$ which control the clutch of the pinions 28 are placed on opposite sides of the hand lever $L^3$ which controls the twin pinion 34. In the drawings small black circles indicate the respective positions of the three hand levers corresponding to the seven combinations used for manœuvering the tractor. These combinations are as follows—

Combination A—full stop.
Combination B—both tractor chains forward on first speed.
Combination C—both chains forward on second speed.
Combination D—both chains backward at first speed.
Combination E—one chain forward at first speed.
Combination F—one chain forward at second speed and one chain stopped.
Combination G—One chain backward at first speed—one chain backward at second speed.

In case of combination E and F the stop chains can be jammed by means of the brake. These combinations are used when it is desired to turn the tractor on any given curve and the combination G is to turn the machine on itself.

To arrange the tractor chains for travelling on roads (see Figures 8 and 9) metal clamps 44 are applied to the successive members or links of the tractor chains and the outer faces of these clamps are provided with masses of rubber or similar material 45 which are fastened by the rims 46 to the clamps. The inner faces of the clamps conform to the outer faces of the links 47. One of the fastening edges of the clamp 44 is bent inward as at 48 to hook over one edge 49 of the link 47; and the other edge which is suitably extended is provided with two bolts or latches 51 connected to a flat spring 52 fastened on the clamp, which spring is slightly bent to facilitate operation. The latches 51 are provided with inclined planes 53 and are locked under the edge 54 of the link. In this manner the clamps can be quickly adjusted, each to one link by a single thrust of the hand and may be removed by pulling the ends of the spring 52 so as to disengage the latches 51 from the edge 54 of each link. In order to prevent longitudinal sliding of the clamps the links are provided with upturned edges 55.

What is claimed is—

1. In a tractor, speed changing means adapted for guiding, determining and coordinating the movements of the tractor combining in combination an internally toothed gear fixed concentrically with the felly of the driving wheel, an externally toothed gear mounted on the hub of the same, a pinion placed between said gears with its shaft parallel to that of the driving wheels, a mounting for said shaft carried by an eccentric supported on a guard-plate fixed to the driving wheel shaft, manual means for rotating said eccentric, and means for rotating said pinions in either direction.

2. In a device of the character set forth in claim 1 hereof, a connecting rod pivotally connected with said eccentric and a hand lever operatively connected with said connecting rod.

3. Means for turning the pinion claimed in claim 1 in either direction, comprising in combination a shaft in line with that which carries said pinion and connected thereto by a flexible joint, a driving pinion having two sets of teeth and keyed on said shaft so as to be slidable therewith, manual means for shifting said pinion, bevel gears mounted loose on said shaft on opposite sides of said pinion and having internal teeth adapted to mesh with those on said pinion, a common driving pinion arranged between and permanently engaging said gears, and a supporting casing for the structure set forth fixed behind and between the rear wheels of the tractor.

In testimony whereof I affix my signature in presence of two witnesses.

LEON CHARLES MURET.

Witnesses:
M. DEBENEDETTI,
PETER PETERSEN.